July 6, 1965  P. J. WOLFF  3,192,901
EGG LAYING HOUSE AND CAGE SUPPORT THEREFOR
Filed April 6, 1964  3 Sheets-Sheet 1
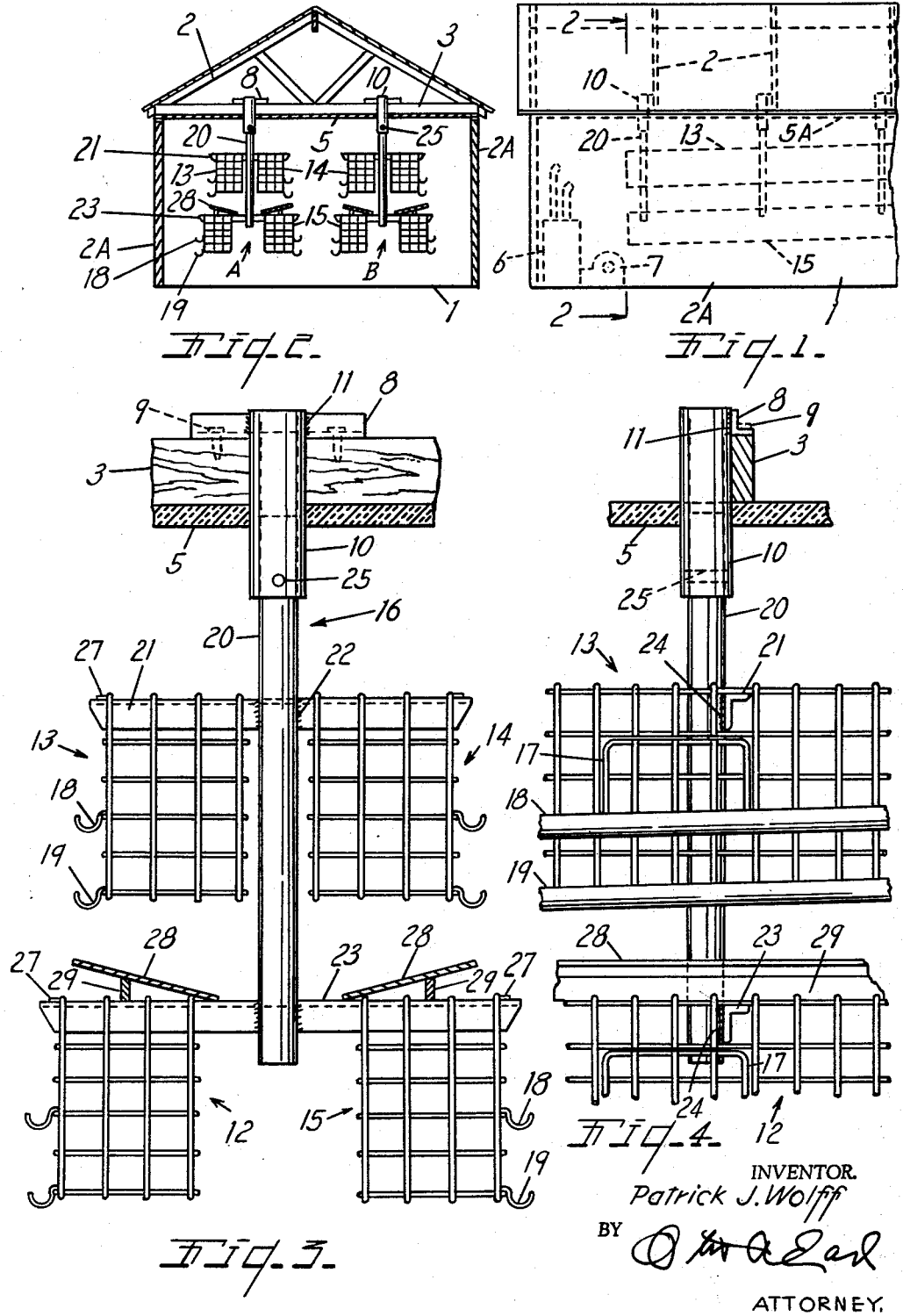
INVENTOR.
Patrick J. Wolff
BY
ATTORNEY.

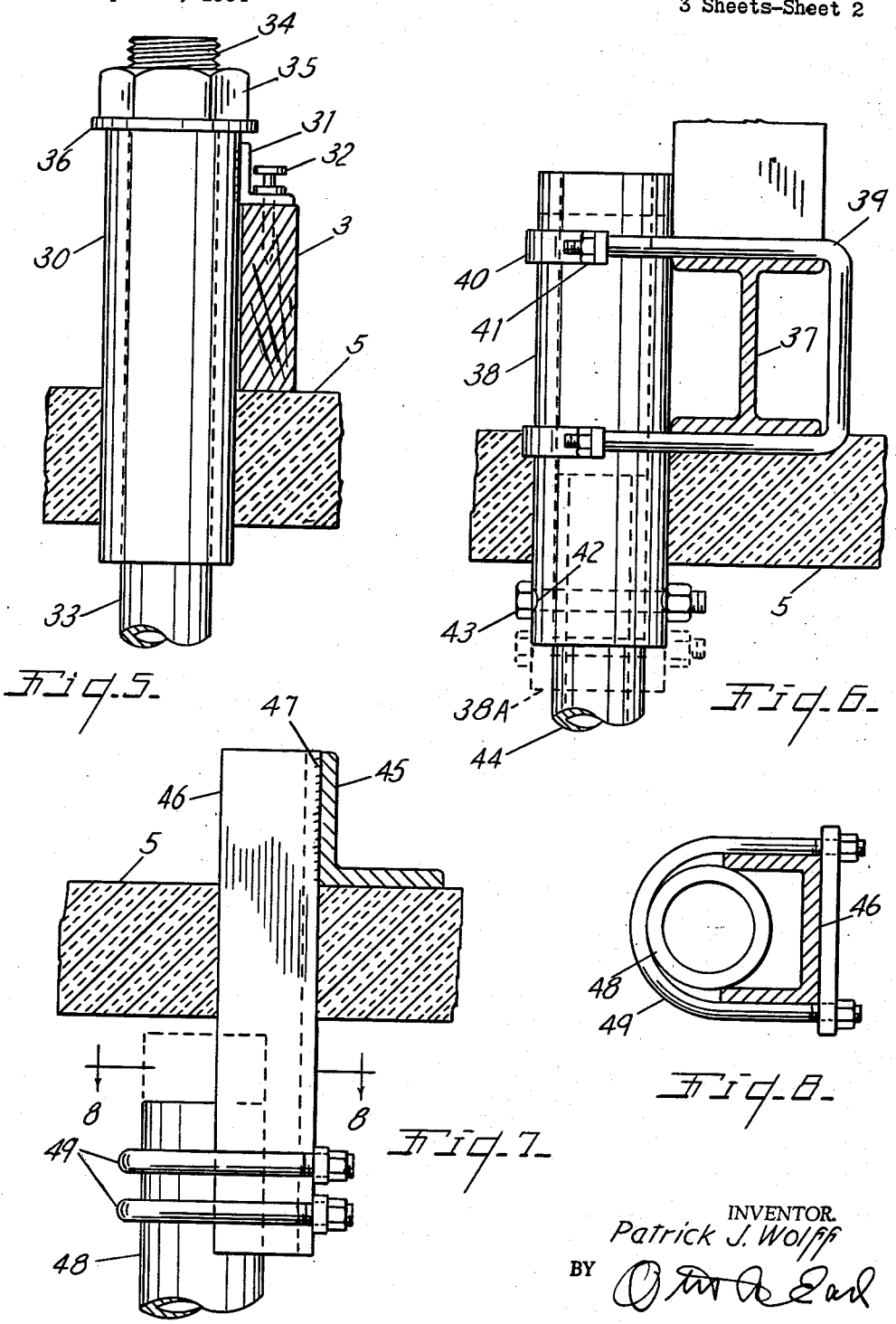

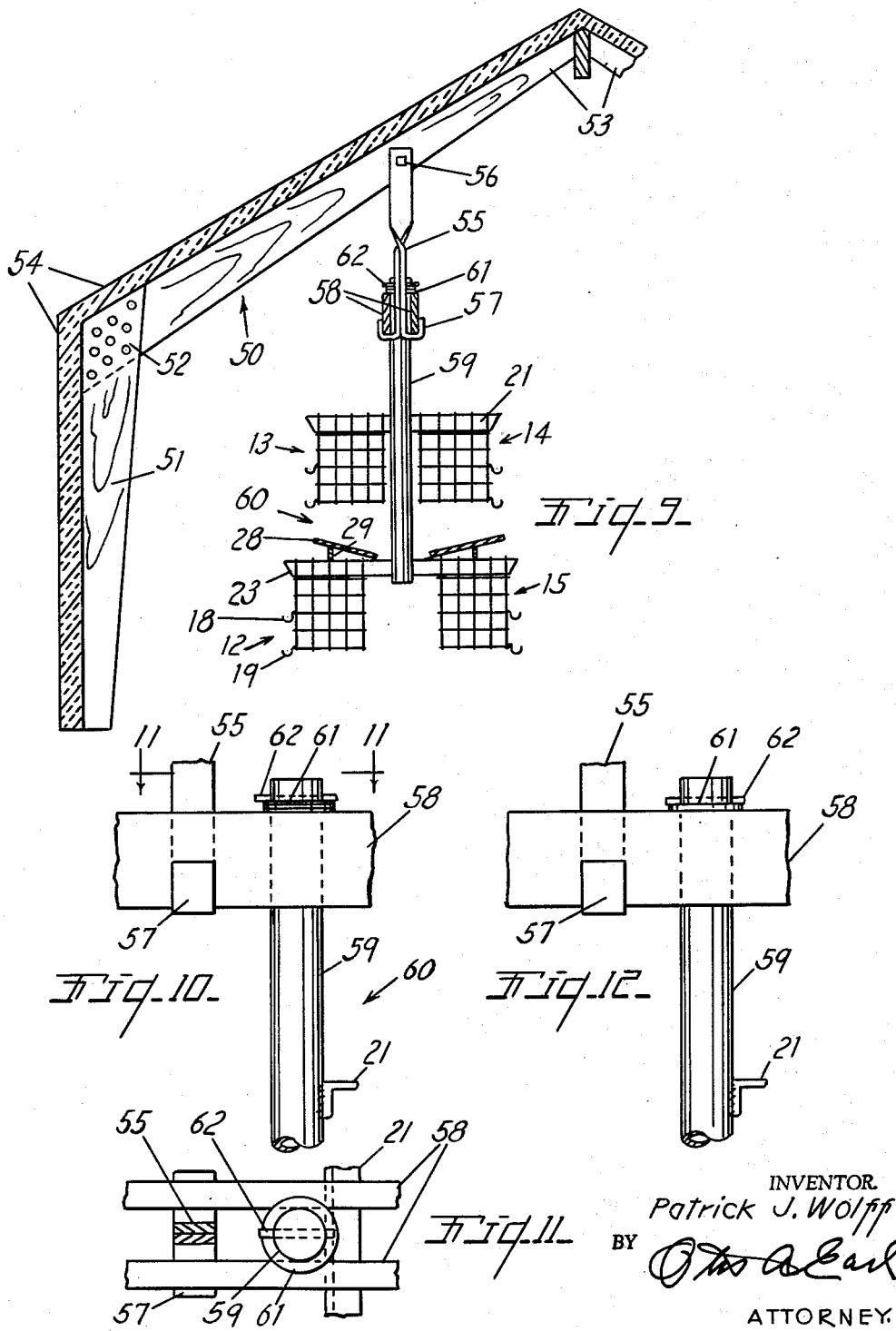

United States Patent Office 3,192,901
Patented July 6, 1965

3,192,901
EGG LAYING HOUSE AND CAGE SUPPORT
THEREFOR
Patrick J. Wolff, 9443 W; P Ave., Kalamazoo, Mich.
Filed Apr. 6, 1964, Ser. No. 357,416
16 Claims. (Cl. 119—17)

This invention relates to improvements in An Egg Laying House and Cage Support Therefor. The principal objects of this invention are:

First, to provide a novel form of cage support for the hens in an egg laying house which will accurately position the cages in inclined rows so that water may be delivered to each cage along an accurately inclined trough and so that the cages may be arranged in vertically and laterally offset rows with deflector boards between the rows to prevent droppings from upper cages from falling on birds in lower cages.

Second, to provide a cage hanger support which is readily mountable in laying houses having a variety of structural supports to position the rows of cages at the desired accurately controlled incline for the delivery of water along the rows of cages.

Third, to provide a cage hanger for egg laying houses which is easily attachable to the supporting elements of the house prior to installation of the cages on the cage hangers so that the inclination of the rows of cages can be predetermined by the mounting of the hangers.

Fourth, to provide a cage hanger support system which may be installed in a laying house with a minimum of effort and without danger of sagging or collapse of the support and the rows of cages thereon or of deterioration of the cage support due to contact with the droppings from the chickens in the cages.

Other objects and advantages of the invention will be apparent from a consideration of the following description and claims. The drawings, of which there are three sheets, show a highly practical form of the cage hanger of the invention and several modified forms or methods of installing the hanger in different types of laying house constructions.

FIG. 1 is a fragmentary side elevational view of an egg laying house with the cage hanger and support system of the invention assembled therein.

FIG. 2 is a transverse cross sectional view taken along the plane of the line 2—2 in FIG. 1 and showing in general the relationship of the cages and the cage support elements of the invention to the structural supporting elements of the house.

FIG. 3 is an enlarged fragmentary end elevational view of the cage hanger support system shown in FIG. 2.

FIG. 4 is a fragmentary side elevational view of the cage hanger and supporting connections shown in FIG. 3.

FIG. 5 is an enlarged fragmentary cross sectional view showing a first modified form of supporting connection between the cage hanger of the invention and the supporting elements of the building.

FIG. 6 is an enlarged fragmentary cross sectional view showing a second modified form of supporting the cage hanger of the invention to or within a modified type of building structure.

FIG. 7 is an enlarged fragmentary cross sectional view showing a third modified form of supporting connection for the hanger of the invention from a further modified form of building structure.

FIG. 8 is a transverse cross sectional view taken along the plane of the line 8—8 in FIG. 7.

FIG. 9 is a fragmentary vertical transverse cross sectional view through a modified form of laying house construction and a fourth modified form of cage hanger support adapted for use in this modified form of building structure.

FIG. 10 is a fragmentary side elevational view of the cage hanger support shown in FIG. 9.

FIG. 11 is a fragmentary cross sectional view taken along the plane of the line II—II in FIG. 10.

FIG. 12 is a fragmentary side elevational view similar to FIG. 10 but illustrating a further modified form of support for the cage hanger system shown in FIGS. 9 and 10.

Modern egg production has adopted the system of enclosing hens in individual cages in which they are restrained within a minimum space while laying and to which feed and water is delivered along continuous troughs accessible to the hens through the mesh sides of their cages. The cages are arranged in adjacent rows for economy of space and often are arranged in two or more vertically spaced rows for maximum use of the space in the laying house. The atmosphere and temperature within the laying house is accurately controlled and the walls of the house invariably include insulation in order to facilitate the control of the temperature and atmosphere for maximum egg production from the hens. In the past it has been difficult to support the long rows of individual cages with sufficient accuracy of alignment to permit water to flow through a trough in front of all of the cages in the row without spilling over at low spots or being blocked by high spots along the trough. In addition, the previous cage supporting means have been unreliable as to strength and have been subject to deterioration due to contact with the manure droppings from the hens restrained in the cages. The present invention provides a novel hanger means which can be attached to the structural elements of the laying house in the desired degree of inclination prior to mounting the rows of cages on the hangers so that the cost of erecting the rows of cages is materially reduced and so that the support for the cages when installed is accurate and reliable.

Conventionally illustrated in FIGS. 1 and 2 is a laying house 1 having a plurality of roof trusses 2 supported across side walls 2A. The length of the laying house is indefinite and determined by the desires of the operator and laying houses of between 200 and 300 feet in length are not uncommon. The example of the trusses shown in FIGS. 1 and 2 are wooden trusses having cross members or transverse chords 3 on their lower sides. The walls of the building are conventionally insulated and an insulating layer 5 is secured along the lower sides of the chords 3. Atmosphere conditioning equipment such as a heater 6 and circulating blower 7 are conventionally illustrated in FIG. 1. Depending upon the size of the laying house the rows of cages may be arranged in several banks with banks A and B being illustrated in FIG. 2. The construction of the cages and their support in each bank are identical so a description of one bank will suffice.

The wooden chord 3 of the truss 2 or supporting element of the building has a short angle member or bracket 8 secured thereto as by the nails 9 and the angle has a depending tubular sleeve or supporting element 10 secured thereto as by welding at 11 so that the support element projects downwardly through the insulation 5 in the ceiling of the building. The tubular supporting element and its connecting angle member 8 can be easily installed during the erection of the laying house and aligned along the length of the house prior to any attempt to install the cages.

The cages are arranged in rows identified by the numerals 12, 13, 14 and 15 and constitute no part of the present invention except as they are supported by the novel cage supporting frames indicated generally at 16. The cages are commonly available in standard lengths of open mesh frame work and are provided with suitable doors 17 for placing the hens in the cages and are provided with hangers 18 for a water trough and hangers 19 for a feed trough which extend completely along each row of the cages. The hanger frame 16 consists of a tubular upright 20 having an upper cross bar 21 of angle cross section secured thereto as by welding at 22 and a lower cross bar 23 secured near the lower end of the upright or rod 20 by welding as at 24. The lower cross rod is longer than the upper cross rod so that the lower rows 12 and 15 of the cages may be positioned laterally outwardly from the upper rows 13 and 14. After the building is erected with the tubular support members 10 depending below the insulation 5, each individual cage hanger frame 16 is placed at the proper elevation by inserting it upwardly in longitudinally overlapping relation into the tubular support member and is secured in place by suitable means such as the drive rivet 25 which may be driven through both the support element 10 and the rod 20 by a rivet gun. The positioning of the frame 16 is accurately controlled by suitable level or transit means so that the cage support frames are disposed in a constant incline along the bay of the building. Once this incline is accurately established the cages may be easily mounted on the cross bars 21 and 23 by sliding the cross bars through upper openings in the mesh cages. The cages may be retained on the cross bars by pins 27 dropped through holes in the ends of the cross bars. After the cages are in place a drop collecting board 28 may be supported along the lower cross bars 23 in an elevated position by support on the blocks 29 so that droppings from chickens in the upper rows of cages will not fall on the chickens in the lower rows. Droppings which collect on the boards 28 can be periodically scraped backwardly into the space between the lower rows of cages where it drops to the floor without collecting on the cages or the supporting structure.

The modified form of cage support frame mounting shown in FIG. 5 utilizes the same cross member or truss 3 of the building frame to support the insulation 5 and a tubular support member 30 welded to an angle bar 31 which is nailed to the top of the chord by a double headed nail 32. The double headed nails may be used to make corrections for sagging of the chords 3 of the roof trusses. If necessary, the angles 31 may be loosened and spacers or shims placed under the angle if the chord warps or sags. The tubular upright member 33 of the modified cage hanger frame extends completely through the tubular support 30 and has a thread 34 on its upper end adjustably receiving the nut 35 bearing on a washer 36. The elevation of the uprights 33 and the cage support frames can thus be adjusted by adjustment of the nuts 35. In other respects the cage support and assembly is the same as in FIGS. 1 to 4.

FIG. 6 illustrates a further modified form of cage hanger frame support and a modified form of building structure. In this example the roof truss of the building is a metallic truss having a chord 37 of I-beam cross section supporting the same insulation layer 5. The tubular support element 38 is secured to the chord 37 by a pair of U-bolts 39 embracing the chord and engaged through the ends of yokes or cross pieces 40 that are drawn tight by nuts 41 on the ends of the U-bolts. The U-bolts and yokes 40 form an adjustable connection which permit the tubular supporting element 38 to be moved upwardly or downwardly as is indicated by the dotted lines at 38A so that the tubular support elements are adjusted on the chord elements 37 until the support elements are disposed along the desired incline. The lower ends of the support elements have holes 42 formed therethrough which receive the bolts 43 extending through registering holes in the upper ends of the tubular uprights 44 of the frame members. All of the cage support frames are identical as the vertical adjustment to the desired incline is accomplished by adjusting the position of the tubular support elements 38. In other respects the mounting of the rows of cages and the lower ends of the hanger frames are the same as in the other forms of the invention.

FIG. 7 illustrates a further modified form of building structure and hanger frame mounting connection. The chord 45 of the building is a metallic angle to which the supporting element 46 is permanently secured as by welding at 47. The supporting element 46 is a metallic channel member which projects substantially below the insulation 5 so as to permit variable positioning of the tubular upright 48 of the hanger frame to its lower end. The upright 48 is adjustably secured to the supporting element by U-bolts 49 which clamp the tubular upright into the open face of the channel 46. In other respects the hanger frames and cage supports are the same as in the other forms of the invention described.

FIGS. 9 to 12 illustrate the application of the cage support hangers of the invention to a laying house of a different type of construction. In this type of house the main load bearing members are performed arches 50 with uprights 51 rigidly connected in non-bending joints 52 to free span rafters 53. There is no cross joist or chord and the rafters are supported in free or clear span relation. The insulation of this type of building is incorporated in the roof and wall as at 54. The truss illustrated is a laminated wooden truss but similar metal trusses are sometimes used.

Since free span trusses of this type are commonly assembled on wider spaced centers than the trusses 2, and since there is no chord to which the cage hanger frames may be attached, supporting elements in the form of hanger rods 55 are attached to the rafters as by the lag screws 56 or other appropriate connection. The hanger rods have oppositely outwardly turned and upwardly opening hooks 57 which receive and support stringers 58 disposed in spaced relation and extending longitudinally of the building. When the hanger rods 55 are attached at the same point to the rafters so that the hooks 57 are approximately level, the uprights 59 of the cage hanger frames 60 are passed upwardly through the space between the stringers 58. A progressively varied number of washers 61 are placed over the ends of the uprights 59 and a pin 62 is passed through a hole in the upper end of the upright to hold the uprights at progressively different levels and along a uniform slope within the building. The hanger frames have the same cross bars 21 and 23 and support the cages in the same way as in the previous forms of the hanger and assembly.

It may be practical and desirable in some installations to vary the point of attachment of the hanger bars 55 to the rafters 53 so that the hooks 57 are at graduated levels and the stringers 63 are on the desired incline as in FIG. 12. In this case, a single washer 61 is placed under the pin 62 in the upper end of each upright of each hanger frame. Again, the cages are supported on the cross bars as before.

In each form of the cage installation a hanger frame having an upright and cross members is suspended from a structural support element of the laying house by a vertically adjustable connection that can be easily and accurately located along the desired incline after the structure of the house has been assembled. This permits adjustment or compensation for any irregularities which may develop in the assembly of the building. The cages can easily be assembled as pre-manufactured items on the hanger frames and fall automatically into the desired incline as predetermined by the solid and pre-location of the hanger's frames and it is unnecessary to adjust or change the elevation of any cage unit to fit the position of other cages.

What is claimed as new is:

1. In an egg laying house having a plurality of rows of individual hen cages disposed in vertically and laterally spaced relation and structurally supporting roof trusses arranged transversely across and above said rows with insulation for said house supported along the undersides of transverse chord members of said trusses, supporting means supporting said rows of cages in inclines within said house comprising a plurality of
hanger frames having upright tubular rods,
first cross bars of angle section secured transversely to
said rods in spaced relation below their upper ends,
other cross bars longer than said first bars secured
transversely to said rods and spaced below said first
cross bars by a distance greater than the height of
said cages,
tubular supporting elements secured to said chord members by angle shaped brackets secured to the upper
ends of said support elements and secured to the tops
of said chord members with said supporting elements
disposed vertically alongside said chord members and
depending through said insulation,
and means in the form of a self penetrating driven rivet
securing the upper ends of said rods in telescoping
suspended relation of said supporting elements with
said rods and hanger frames at different elevations
relative to said supporting elements whereby said
cross bars are disposed along said inclines,
said cages being hung over the cross bars on adjacent
rods with the upper row of cages spaced inwardly
relative to the next lower row,
and dropping catch boards supported on the lower cross
bars below the upper rows of cages and inclined
downwardly to behind the lower rows of cages.

2. In an egg laying house having a plurality of rows of
individual hen cages disposed in vertically and laterally
spaced relation and structurally supporting roof trusses
arranged transversely across and above said rows with
insulation for said house supported along said trusses,
supporting means supporting said rows of cages in inclines within said house comprising a plurality of
hanger frames having upright rods,
first cross bars of angle section secured transversely to
said rods in spaced relation below their upper ends,
other cross bars longer than said first bars secured
transversely to said rods and spaced below said first
cross bars by a distance greater than the height of
said cages,
supporting elements secured to said supporting roof
trusses by brackets secured to the upper ends of said
supporting elements and secured to the tops of said
supporting roof trusses with said supporting elements
disposed vertically along side said supporting roof
trusses,
and means securing the upper ends of said rods in vertically overlapping depending relation to said supporting elements with said rods restrained against lateral
movement and with said hanger frames at different
elevations relative to said supporting elements whereby said cross bars are disposed along said inclines,
said cages being hung over the cross bars on adjacent
rods with the upper row of cages spaced inwardly
relative to the next lower row,
and dropping catch boards supported on the lower cross
bars below the upper rows of cages and inclined
downwardly to behind the lower rows of cages.

3. In an egg laying house having a plurality of rows of
individual hen cages disposed in vertically and laterally
spaced relation and structurally supporting members of
said house arranged transversely across and above said
rows with insulation for said house supported by said
supporting members,
supporting means supporting said rows of cages in inclines within said house comprising a plurality of
hanger frames having upright rods,
first cross bars secured transversely to said rods in
spaced relation below their upper ends,
other cross bars longer than said first bars secured
transversely to said rods and spaced below said first
cross bars by a distance greater than the height of
said cages,
supporting elements secured to said supporting members
by brackets secured to the upper ends of said supporting elements and secured to said supporting members with said supporting elements depending below
said supporting members,
and means securing the upper ends of said rods in vertically overlapping depending relation to said supporting elements with said rods restrained against lateral
movement and with said hanger frames at different
elevations relative to said supporting elements whereby said cross bars are disposed along said inclines,
said cages being hung over the cross bars on adjacent
rods with the upper row of cages spaced inwardly
relative to the next lower row,
and dropping catch boards supported on the lower cross
bars below the upper rows of cages and inclined
downwardly to behind the lower rows of cages.

4. In an egg laying house having a plurality of rows of
individual hen cages disposed in vertically and laterally
spaced relation and structural roof supporting trusses arranged transversely across and above said rows,
means supporting said rows of cages in said house comprising a plurality of hanger frames having upright
rods with first cross bars secured transversely thereto
below the upper ends of the rods,
second cross bars secured to said rods below said first
cross bars by a distance greater than the height of said
cages,
hanger means supporting said frames from said supporting trusses at progressively greater depending
positions with said cross bars being disposed along
parallel inclines, said hanger means including first
mounting elements rigidly secured to said supporting
trusses,
and means forming a vertically adjustable longitudinal
overlapping connection between said hanger frames
and said first mounting elements vertically supporting
and laterally restraining said frames.

5. In an egg laying house having a plurality of rows of
individual hen cages disposed in vertically and laterally
spaced relation and structural roof supporting elements
arranged transversely across and above said rows,
means supporting said rows of cages in said house comprising a plurality of hanger frames having upright
rods with first cross bars secured transversely thereto below the upper ends of the rods,
second cross bars secured to said rods below said first
cross bars by a distance greater than the height of
said cages,
and hanger means longitudinally vertically overlapping
the upper ends of said frames and supporting and restraining lateral movement of said frames in all directions at increasingy different vertical positions
from said supporting elements and at progressively
greater distances whereby said cross bars are disposed
along parallel inclines.

6. A cage assembly in a laying house having structural
supporting members spaced along the house comprising,
rigid supporting elements having a first series of connections to the supporting members of the house at
points spaced longitudinally along the house,
a plurality of hanger frames having vertically spaced
cross bars spaced below their upper ends and having
upright rods above said cross bars disposed in alignment below said supporting elements,
another series of connections supportingly connecting
said upright rods to said supporting elements,
one of said series of connections being vertically and
progressively and regularly varied along the series
and being connectable after the erection of the supporting members of the laying house, and cages supported in rows on the cross bars of said hangers and
inclined along the incline of said one series of connections, both of said series of connections having
vertically overlapping portions of the connected parts
resisting lateral swinging of said hanger frames.

7. A cage support system in a laying house having elevated structural supporting members spaced along the house and extending transversely thereof comprising, rigid supporting elements having a first series of connections to the supporting members of the house at points spaced and alined longitudinally along the house, a plurality of hanger frames having vertically spaced cross bars spaced below their upper ends and having upright rods above said cross bars disposed below said supporting elements and adapted to receive and support cages, and another series of connections supportingly connecting said upright rods to said supporting elements, one of said series of connections being vertically and regularly varied along the series and constituting connectable means for inclining the rows of cross bars after the erection of the supporting members of the laying house, both of said series of connections having vertically overlapping portions of the connected parts resisting lateral swinging of said hanger frames.

8. A cage support system as defined in claim 7 in which said one series of vertically varied connections includes tubes as said supporting elements telescopically engaged with said rods and cross connecting pin means engaged through said tubes and rods at selected differing vertical positions relative to said cross bars.

9. A cage support system as defined in claim 7 in which said rigid supporting elements consist of hanger straps with oppositely laterally spaced upwardly opening hooks with longitudinal stringers supported in said hooks, and said other series of connections includes the upper ends of said rods positioned between said stringers with transverse pins passed through the upper ends of said rods and supported on the tops of said stringers.

10. A cage support system as defined in claim 9 in which said one series of vertically varied connections includes spacers of varying height positioned around adjacent rods between said pins and said stringers.

11. A cage support as defined in claim 9 in which said one series of vertically varied connections consists of vertically varied points of attachment of said supporting elements to said supporting members.

12. A cage support system as defined in claim 7 in which said one series of vertically varied connections includes supporting elements vertically adjustably clamped to said supporting members, and said other series of connections includes connecting members engaged through holes formed uniformly through adjacent ends of said support elements and said rods.

13. A cage support system as defined in claim 7 in which said one series of vertically varied connections includes an overlapped engagement between said support elements and said rods, and clamp means selectively clamping the overlapped parts in different degrees of overlap.

14. A cage support system as defined in claim 13 in which said support elements consist of bars of angled section and said rods are of circular cross section with clamp means selectively clamping the circular sections into the angled cross section of the support elements.

15. A cage support system as defined in claim 7 in which said support elements consist of upright tubes with said rods projecting telescopically therethrough, and said varied series of connections consists of nuts threaded on the ends of said rods and bearing against the ends of said tubes.

16. A cage support for egg laying houses comprising a rigid upright with vertically spaced rigid cross members secured thereto below the upper end of the upright, said cross members being adapted to project into and support cages on each side of the upright, the lower of said cross members being longer than the upper cross member on each side by an amount greater than the transverse width of said upright, a support element attachable to a fixed portion of a laying house, and means forming a selectively vertically variable and laterally rigid connection between the upper end of said upright and said support element with laterally overlapping engagement between the upright and the support element.

References Cited by the Examiner
UNITED STATES PATENTS

| | | | |
|---|---|---|---|
| 2,061,712 | 11/36 | Martin | 119—18 |
| 2,612,862 | 10/52 | Ispen | 119—18 |
| 2,851,990 | 9/58 | Rowland | 119—18 |
| 2,863,418 | 12/58 | Pockman | 119—18 |
| 2,882,857 | 4/59 | Ernst et al. | 119—18 |
| 2,946,309 | 7/60 | Page | 119—22 |
| 2,970,567 | 2/61 | Rubin | 119—22 |
| 3,124,102 | 3/64 | Kurtz et al. | 119—48 |

SAMUEL KOREN, *Primary Examiner.*

ALDRICH F. MEDBERY, *Examiner.*